United States Patent
Chen et al.

(10) Patent No.: US 9,813,438 B2
(45) Date of Patent: Nov. 7, 2017

(54) ANOMALY PREDICTION METHOD AND SYSTEM FOR HETEROGENEOUS NETWORK ARCHITECTURE

(71) Applicant: Wistron Corporation, New Taipei (TW)

(72) Inventors: Chun-Ching Chen, New Taipei (TW); Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 150 days.

(21) Appl. No.: 15/044,081

(22) Filed: Feb. 15, 2016

(65) Prior Publication Data

US 2017/0048263 A1   Feb. 16, 2017

(30) Foreign Application Priority Data

Aug. 14, 2015 (TW) .............................. 104126592 A

(51) Int. Cl.
*H04L 12/863* (2013.01)
*H04L 29/06* (2006.01)
*H04L 12/813* (2013.01)

(52) U.S. Cl.
CPC ...... *H04L 63/1425* (2013.01); *H04L 63/0227* (2013.01); *H04L 63/0263* (2013.01)

(58) Field of Classification Search
None
See application file for complete search history.

(56) References Cited

U.S. PATENT DOCUMENTS

| 2014/0189074 | A1 | 7/2014 | Parker |
| 2014/0207923 | A1 | 7/2014 | Jokinen et al. |
| 2015/0180784 | A1* | 6/2015 | Tokutsu .............. H04L 12/4015 370/429 |

FOREIGN PATENT DOCUMENTS

| CN | 201758454 | 3/2011 |
| CN | 102724711 | 10/2012 |

OTHER PUBLICATIONS

Open IPTIV Convergence Service Creation and Management using Service Delivery Platform. Yoon, Changwoo. ICACT(2015).*
Communication framework for MMOG based on custom protocol. Ren-wei, Mao et al. Elsevier(2013).*
Dragon: A Framework for Service Provisioning in Heterogeneous Grid Networks. Lehman et al. IEEE(2006).*
"Office Action of Taiwan Counterpart Application" with English translation thereof, dated Oct. 3, 2016, p. 1-p. 11, in which the listed references were cited.

* cited by examiner

Primary Examiner — Venkat Perungavoor
(74) Attorney, Agent, or Firm — JCIPRNET

(57) ABSTRACT

An anomaly prediction method and system for heterogeneous network architecture are provided. A gateway receives a packet and converts the packet to conform to a switching format. The gateway compares the packet and a security policy. The gateway transmits the packet to a controller after determining the packet has no anomaly. The controller sets a priority of the packet, converts the packet to conform a target format and stores the packet to a queue temporarily. The controller relays the packet to a destination address according to the priority and the destination address of the packet.

20 Claims, 2 Drawing Sheets

ANOMALY PREDICTION METHOD AND SYSTEM FOR HETEROGENEOUS NETWORK ARCHITECTURE

CROSS-REFERENCE TO RELATED APPLICATION

This application claims the priority benefit of Taiwan application serial no. 104126592, filed on Aug. 14, 2015. The entirety of the above-mentioned patent application is hereby incorporated by reference herein and made a part of this specification.

BACKGROUND

Field of the Invention

The invention is directed to a data security mechanism and more particularly, to an anomaly prediction method and system for heterogeneous network architecture.

Description of Related Art

The development and utilization of the Internet is being continuously growing, from the previous generation of desktop computers, gradually to the generation of portable computers, and now, comes the generation of Internet of Things (IoT). With evolution and innovation of technologies, those with the capability for connecting with the Internet are no longer limited to the desktop computers, notebook computers or smart phones, and the expectation that all objects can be connected to the Internet for convenient control has been arisen. As this subject becomes popular, considerable resources and developments from a variety of fields and businesses have been invested, which also lead to difference in specifications adopted by each business and difficulty in the integration of front-end and back-end systems.

Additionally, networking objects are no longer limited to only computers, and data generated by various products after being connected to the Internet contain various information, including normal information, spam information, emergent events or other valuable data. However, as more and more data of information has to be delivered through the Internet, issues with respect to network bandwidths and network security have inevitably arisen. The conventional firewall techniques can only achieve the restrictions of accessible ports, and packet anomaly detection, but cannot achieve packet anomaly prediction.

SUMMARY

The disclosure provides an anomaly prediction method and system for heterogeneous network architecture capable of implementing a firewall mechanism in a gateway to immediately block unknown packets or malicious packets.

According to an embodiment of the disclosure, an anomaly prediction method for heterogeneous network architecture is provided. The method includes: receiving a packet from an electronic apparatus and converting the packet to conform to a switching format through a gateway, wherein the gateway has at least one first security policy; comparing the packet conforming to the switching format and the at least one first security policy to determine whether the packet has anomaly through the gateway; after determining that the packet has no anomaly, transmitting the packet to a controller through the gateway, and setting a priority of the packet based on at least one second security policy through the controller; converting a format of the packet from the switching format to a target format and temporarily storing the packet in a queue through the controller; and relaying the packet to a destination address according to the priority and the destination address of the packet by the controller.

In an embodiment of the disclosure, the at least one first security policy records a security rule and a corresponding processing operation. The method further includes: after the gateway receives the at least one first security policy, converting the at least one first security policy to conform to a format of a storage table of the gateway to write the at least one first security policy into the storage table through the gateway. The step of writing the at least one first security policy into the storage table includes: writing the security rule into a rule column; and writing the processing operation into an operation column, wherein the storage table further includes a status column recording a packet count of the gateway receiving the packet.

In an embodiment of the disclosure, the step of determining whether the packet conforming to the switching format has anomaly based on at least one first security policy through the gateway includes: comparing the received packet and the security rule; and when determining that the packet matches the security rule, obtaining the processing operation corresponding to the matched security rule through the gateway.

In an embodiment of the disclosure, when the processing operation is a activate operation, the packet is transmitted to the controller through the gateway. When the processing operation is a filter operation, the packet is adjusted and then transmitted to the controller through the gateway. When the processing operation is a block operation, the packet blocked through the gateway, and the gateway is stopped from transmitting the packet.

In an embodiment of the disclosure, the at least one second security policy records a security rule and priority information. The at least one second security policy is converted to conform to a format of a storage table of the controller to write the at least one second security policy into the storage table through the controller. The step of writing the at least one second security policy into the storage table includes: writing the security rule into a rule column; and writing the priority information into a priority column.

In an embodiment of the disclosure, after the packet is transmitted to the controller through the gateway, the method further includes: comparing the received packet and the security rule; and when determining that the packet matches the security rule, setting the priority of the packet based on the priority information.

In an embodiment of the disclosure, the anomaly prediction method further includes: generating the at least one first security policy and the at least one second security policy through the controller; and transmitting the at least one first security policy to the gateway through the controller. The step of generating the at least one first security policy and the at least one second security policy includes: analyzing a plurality of packet records to obtain an anomaly group and a misuse group; obtaining a positive sample from the anomaly group, and obtaining a negative sample from the misuse group; and establishing the at least one first security policy and the at least one second security policy based on the positive sample and the negative sample.

In an embodiment of the disclosure, the packet records are stored in a training database, and the positive sample and the negative sample are stored in a pattern database.

In an embodiment of the disclosure, after the step of transmitting the packet to the controller through the gateway, whether the gateway transmitting the packet is valid is further determined through the controller. When the gateway is determined as valid, the format of the packet is converted from the switching format to the target format through the controller. When the gateway is determined as invalid, the packet is stopped relaying to the destination address.

In an embodiment of the disclosure, the step of relaying the packet to the destination address according to the priority and the destination address of the packet by the controller includes: transmitting the packet to the gateway by the controller, and transmitting the packet to the destination address by the gateway.

According to another embodiment of the disclosure, an anomaly prediction system for heterogeneous network architecture including a gateway and a controller is provided. The gateway has at least one first security policy. The controller includes a protocol converter. The gateway receives a packet from an electronic apparatus, converts the packet to conform to a switching format, and compares the packet conforming to the switching format and the at least one first security policy to determine whether the packet has anomaly, so as to transmit the packet to the controller after determining that the packet has no anomaly. After receiving the packet from the gateway, the controller sets a priority of the packet based on at least one second security policy, and the protocol converter converts the format of the packet from the switching format to a target format, and temporarily stores the packet conforming to the target format in a queue. And the controller relays the packet to a destination address according to the priority and the destination address of the packet.

Based on the above, through being compared with the security policies, abnormal packets are directly discarded and not processed, and normal packets are placed in the queue, and the packets are sequentially transmitted to the destination address according to the priority of each packet in the queue, i.e., flow control can be achieved by using the priority. In addition, since the packets determined as abnormal by the gateway are not stored in the queue, a speed for transmitting other packets can be faster, which contributes to immediate splitting to achieve inbound/outbound load balance.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
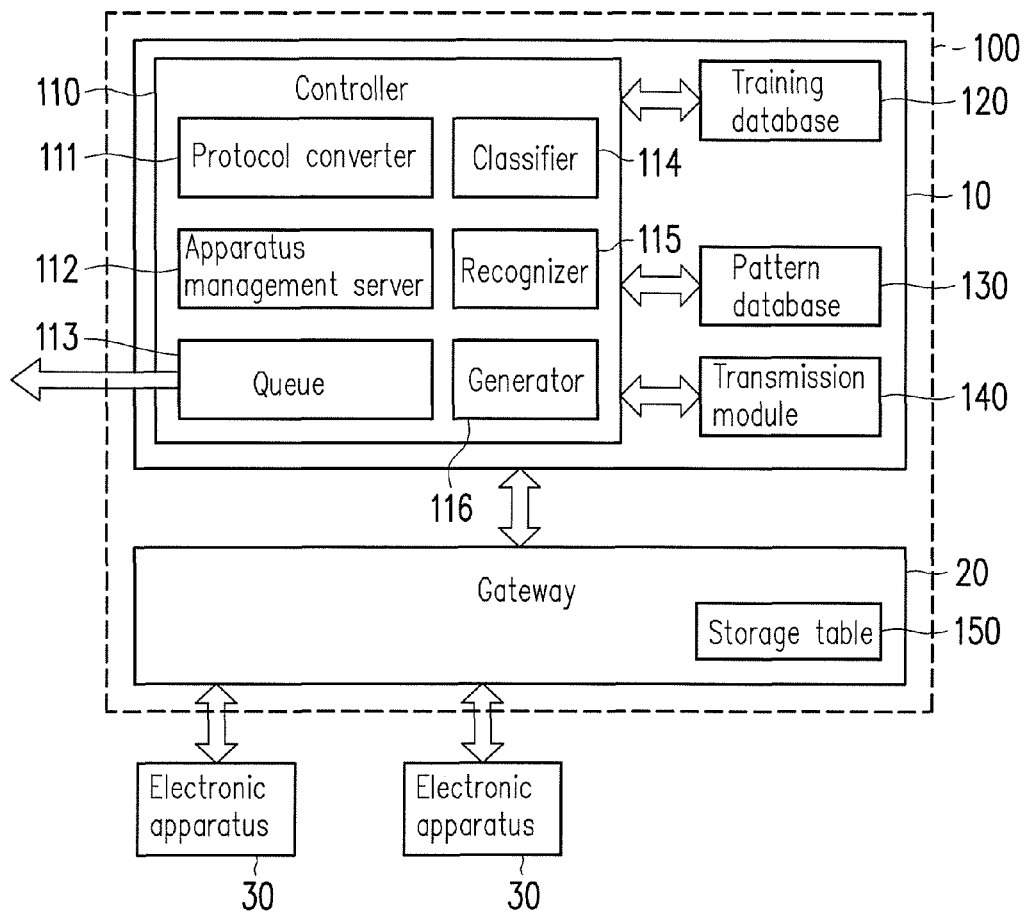
FIG. 1 is a block diagram illustrating an anomaly prediction system for heterogeneous network architecture according to an embodiment of the disclosure.

FIG. 1 is a block diagram illustrating an anomaly prediction system for heterogeneous network architecture according to an embodiment of the disclosure. Referring to FIG. 1, an anomaly prediction system 100 includes an anomaly prediction apparatus 10 and a gateway 20. The number of the gateway 20 may be one or a plurality. The anomaly prediction apparatus 10 may be coupled to the gateway 20 in a wired or a wireless manner. In the present embodiment, the gateway 20 is coupled to one or more electronic apparatuses 30. The gateway 20 is implemented by software and is software-defined, so as to be installed in various platforms, such as person computers (PC), notebook computers (NB), tablet PCs, smart phones, smart watches, Internet TVs, proxy servers, servers and so on.

For instance, the anomaly prediction system 100 may be applied in an Internet of Things (IoT) in a smart home health care environment. In this case, the electronic apparatus 30 may be an electronic product equipped with a sensing element and networking capability, such as a smart air-conditioner, television, refrigerator, clothes and watch. However, the above is only one of the applications, which construes no limitations to the application range of the anomaly prediction system 100.

The anomaly prediction apparatus 10 may be an apparatus with computing capability, such as a server, a PC, a NB, a tablet PC and a smart phone. The anomaly prediction apparatus 10 is configured to generate security policies according to a plurality of packet records. The packet records may include packet records returned by the gateway 20 or the electronic apparatus 30 and may also packet records provided by an external information exchange platform (not shown). The packet records in the information exchange platform may be shared by manufactures or other users.

The anomaly prediction apparatus 10 includes a controller 110, a training database 120, a pattern database 130 and a transmission module 140. The controller 110 may be, for example, a central processing unit (CPU), a programmable microprocessor, an embedded control chip, a digital signal processor (DSP), an application specific integrated circuits (ASIC) or the like.

The controller 110 further includes a protocol converter 111, an apparatus management server 112, a queue 113, a classifier 114, a recognizer 115 and a generator 116. In the present embodiment, an anomaly prediction method is implemented in a format of program codes, for example, and functions of the protocol converter 111, the apparatus management server 112, the queue 113, the classifier 114, recognizer 115 and the generator 116 are implemented in the format of program codes. The protocol converter 111, the apparatus management server 112, the queue 113, the classifier 114, the recognizer 115 and the generator 116 are constituted by one or a plurality of program code segments, and the program code segments after being installed are executed by the controller 110. In other embodiments, the protocol converter 111, the apparatus management server 112, the queue 113, the classifier 114, the recognizer 115 and the generator 116 may also be implemented by a hardware processor or one or a plurality of logic chips.

The training database 120 stores a plurality of packet records. The pattern database 130 is configured to store sample features obtained through training. To be detailed, the gateway 20 collects packet records from each electronic apparatus 30, and transmits the collected packet records to the training database 120 of the anomaly prediction system 100 through the gateway 20. Meanwhile, the controller 110 analyzes, classifies and recognizes the packet records, so as to establish the pattern database 130.

To be specific, the controller 110 establishes the security policies based on a misuse group and an anomaly group through the classifier 114, the recognizer 115 and the generator 116, and the protocol converter 111, the apparatus management server 112 and the queue 113 facilitates in forwarding packets.

The classifier 114 analyzes the plurality of packet records to obtain the anomaly group and the misuse group. For example, the classifier 114 performs misuse detection and anomaly detection by means of a k-nearest neighbors (KNN) algorithm, so as to obtain the misuse group by the misuse detection and obtain the anomaly group by the anomaly group. Meanwhile, the misuse group and the anomaly group are stored in the pattern database 130.

The recognizer 115 obtains a positive sample from the anomaly group and obtains a negative sample from the misuse group. In this case, the recognizer 115 first cuts a known virus or an abnormal packet into minimum units, such as tags, columns, and defines each tag. For example, "Tag 1" is a timestamp, "Tag 2" is a source address, "Tag 3" is a packet size, and "Tag 4" is a protocol type.

In the misuse detection, a database with respect to features of various types of known intrusion modes or attack behaviors is established, and whether source data contains a mode, like the intrusion mode or the attack behavior, is analyzed by means of pattern matching, and if yes, the source data is determined as an intrusion event. Negative samples are obtained by the misuse detection.

In the anomaly detection, a normal profile of a user is established, normal standard values are defined, and if some detected behaviors exceeding the standard values are determined as occurrence of intrusion behaviors. Positive samples are obtained by the anomaly detection. Namely, the positive samples serve to specify normal network behaviors, and whatever does not pertain to a range of the normal behaviors are considered as abnormal network behaviors. The feature samples may also serve to specify the abnormal network behaviors, and whatever does not pertain to a range of the feature behaviors are considered as normal network behaviors.

For example, the packet is classified in to the anomaly group due to conforming to a condition as follows, i.e., a packet count per second less than 5, a packet size smaller than 100K, port 80 and a destination Internet protocol (IP) address from the same IP address.

The generator 116 establishes a first security policy and a second security policy based on the positive sample and the negative sample. The first security policy is used by the gateway 20, and the second security policy is used by the controller 110. For example, the generator 116 establishes the corresponding first security policy and second security policy according to the features of the positive sample and establishes the corresponding first security policy and second security policy according to the features of the negative sample. For example, the first security policy specifies a condition as follows, i.e., a packet count per second less than 10, a port 80, packet size smaller than or equal to 343 bytes, a session count greater than or equal to 50, and a packet that does not meet the condition is considered as an abnormal packet.

For example, in the anomaly detection scenario, the controller 110 sets a reasonable value range of a congestion threshold by means of data analysis. Then, the first security policy and the second security policy are established based on the congestion threshold and the packet records accumulated to present in the anomaly group, which may be inferentially applied in the misuse detection scenario in the same way. The security policy may be one of or a combination of, for example, a usage permission, a usage frequency, a data amount, a priority, but the disclosure is not limited thereto.

Thereafter, the controller 110 transmits the first security policy to the gateway 20 through the transmission module 140, so as to achieve a firewall function by means of recording the first security policy in the gateway 20. After receiving the first security policy, the gateway 20 further converts the first security policy to conform to a format of the storage table 150 thereof to write the first security policy into the storage table 150.

Figure 2:
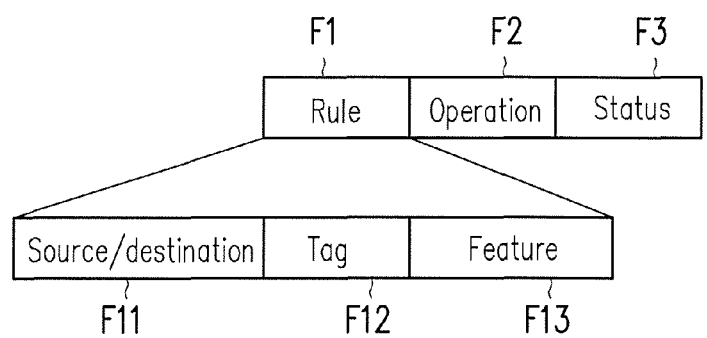
FIG. 2 is a schematic diagram illustrating a storage table of the gateway according to an embodiment of the disclosure.

FIG. 2 is a schematic diagram illustrating a storage table of the gateway according to an embodiment of the disclosure. The first security policy records a security rule and a corresponding processing operation. After receiving the first security policy, the gateway 20 converts the first security policy to conform to a format of the storage table 150 to write the security rule and the processing operation into corresponding columns.

Referring to FIG. 2, the storage table 150 includes three columns, which are a rule column F1, an operation column F2 and a status column F3. After the obtaining the first security policy, the gateway 20 writes the security rule into the rule column F1, and writes the processing operation into the operation column F2. The processing operation is, for example, an activate operation, a filter operation or a block operation. The rule column F1 contains a source/destination column F11, a tag column F12 and a feature column F13. The source/destination column F11 records an IP address or a medium access controller (MAC) address. The tag column F12 records an operation to be performed. The feature column F13 records a tag content parameter. The operation column F2 records a processing operation. The status column F3 records the packet count and the session count.

In the present embodiment, when the processing operation corresponding to the matched security rule is the filter operation or the block operation, the packet is determined as abnormal. When the processing operation corresponding to the matched security rule is the activate operation, the packet is determined having no anomaly. Meanwhile, in the scenario that the processing operation is the activate operation, the gateway 20 directly transmits the packet to the controller 110. In the scenario that the processing operation is the filter operation, the gateway 20 adjusts the packet and then transmits the adjusted packet to the controller 110. In the scenario that the processing operation is the block operation, the gateway 20 blocks the packet, such that the packet is not transmitted to the controller 110.

Additionally, in other embodiments, the security rule in the first security policy may also only serve to define whether the received packet is valid, such that the corresponding operation column F2 records an anomaly preventing operation (i.e., the filter operation or the block operation) in case the packet is determined as invalid (abnormal). For example, when the packet matches the security rule, the packet is determined as having no anomaly and directly transmitted to the controller 110. When the packet does not match the security rule, the packet is determined as abnormal, such that the corresponding operation column is read to obtain the processing operation.

Figure 4:
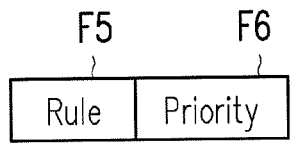
FIG. 4 is a schematic diagram illustrating a storage table of the controller according to an embodiment of the disclosure.

FIG. 4 is a schematic diagram illustrating a storage table of the controller according to an embodiment of the disclosure. The second security policy records a security rule and priority information. The controller 110 converts the second security policy to conform to a format of a storage table 410 of the controller 110 to write the security rule and the priority information into corresponding columns.

Referring to FIG. 4, the storage table 410 includes two columns, which are a rule column F5 and a priority column F6. The rule column F5 is configured to record the security rule, which functions the same way as the rule column F1 illustrated in FIG. 2 and thus, will not be repeatedly described. The priority column F6 is configured to record the priority information. After the gateway 20 transmits the packet to the controller 110, the controller 110 compares the received packet and the security rule and sets a priority of the packet based on the priority information when determining the packet matching the security rule.

Figure 3:
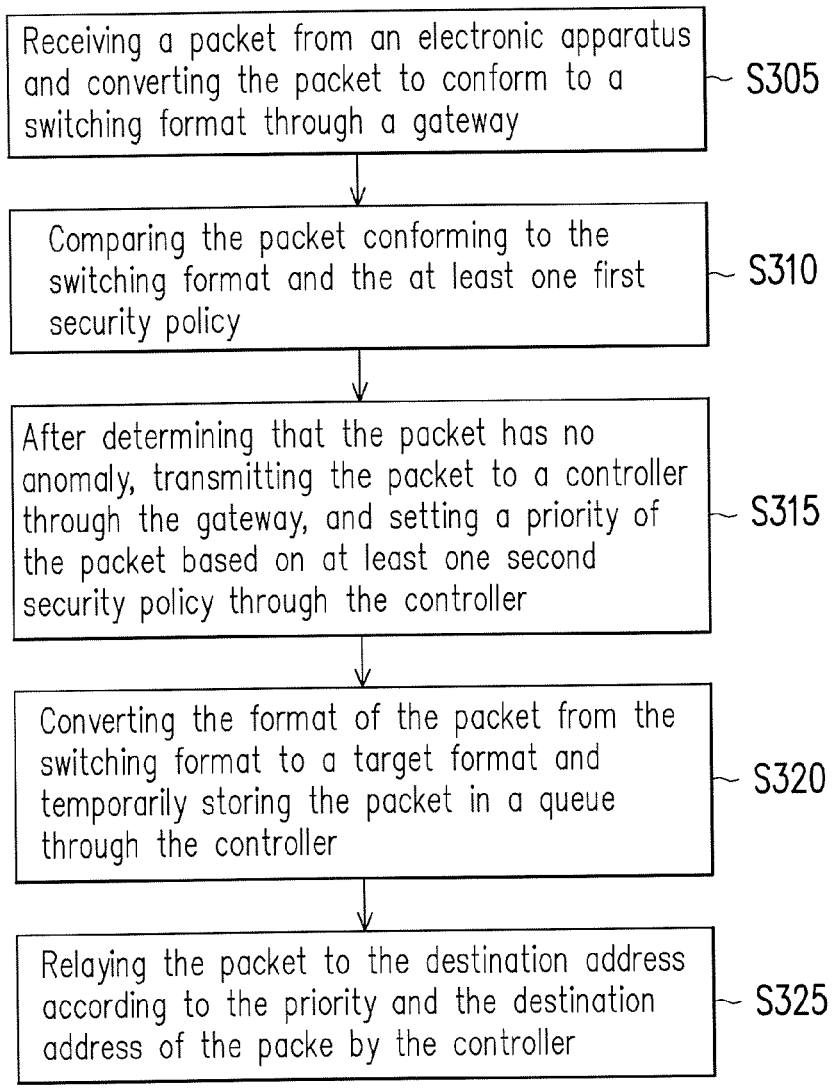
FIG. 3 is a flowchart illustrating an anomaly prediction method for heterogeneous network architecture according to an embodiment of the disclosure.

Each step of the anomaly prediction method will be described with reference the anomaly prediction system 100 hereinafter. FIG. 3 is a flowchart illustrating an anomaly prediction method for heterogeneous network architecture according to an embodiment of the disclosure. Referring to both FIG. 1 and FIG. 3, in step S305, the gateway 20 receives a packet from the electronic apparatus 30 and converts the packet to conform to a switching format. The gateway 20 provides a switching format adaptive to various packet formats. The switching format is for example, a multi-protocol label switching (MPLS) format.

An MPLS is a technique integrating a tag switching architecture with a routing mechanism of a network layer, of which the concept lies in assigning a label header with a fixed length to the packet entering the gateway 20, such that a forward operation is performed according to the label header in the packet. Generally, the label header is inserted between a header of a data link layer and a header of a network layer of the packet, and the label header records a label transforming path. Accordingly, a transmission of the packet on the network is determined according to the label header in the follow-up forwarding process, instead of reading the header of the third layer (network layer).

Then, in step S310, the gateway 20 compares the packet conforming to the switching format with a first security policy. The gateway 20 compares the received packet with a security rule of a storage table. When the packet is determined as matching the security rule, the gateway 20 obtains a processing operation corresponding to the matched security rule. The processing operation is, for example, an activate operation, a filter operation or a block operation.

In a scenario that the processing operation is the activate operation, the gateway 20 directly transmits the packet to the controller 110. In a scenario that the processing operation is the filter operation, the gateway 20 adjusts the packet and then transmits the adjusted packet to the controller 110. In a scenario that the processing operation is the block operation, the gateway 20 blocks the packet, such that the packet is not transmitted to the controller 110. On the other hand, in the scenario that the processing operation is the block operation, the gateway 20 further transmits the packet to the controller 110 or another gateway.

Thereafter, in step S315, after determining that the packet has no anomaly, the gateway 20 transmits the packet to the controller 110, and the controller 110 sets a priority of the packet based on a second security policy. In this case, the transmitted packet conforms to the switching format.

When the packet entering the gateway 20, the gateway 20 determines whether the packet has anomaly by looking up in the recorded first security policy, and not matter whether the packet has anomaly, a packet count is accumulated. In this way, an amount of packets received within a time period may be further calculated, and thereby, the security policy is updated according to the packet count. For example, as for the first security policy in which the congestion threshold is set to 5 times per 10 seconds, if it is assumed that a packet is received from an source address aa for 10 times within 10 seconds, the received packet of the former 5 times is executed, and the packet received after the $6^{th}$ time will not be executed. Moreover, after this receipt record is returned to the controller 110, the controller 110 updates the first and the second security policies to directly blockade the source address aa, deny the packet transmitted from the source address aa, and so on, for example. However, the aforementioned is only an example for illustration, and the disclosure is not limited thereto.

After receiving the packet, the controller 110 sets the priority of the packet based on priority information in the second security policy. Meanwhile, after receiving the packet, the controller 110 may further compare the received packet with the security rule according to the storage table 410 and set the priority of the packet based on the priority information after determining that the packet matches the security rule.

For example, the priority information includes three tags, where Tag 1 represents a destination address (e.g., IP=10.25.1.1), Tag 2 represents a communication port (e.g., port=25), and Tag 3 represents a packet size (e.g., bytes<=10M). When the packet conforms to the priority information, it represents that the packet has high priority.

For example, the priority may be further set to be indicated by levels, e.g., the priority set to 1 represents the highest priority, and the greater the number, the lower the priority. In this case, the controller 110 may learn that the address 10.25.1.1 and the communication port 25 represent an alarm system, whose priority is set to 1, according to analysis of historical data.

In Example 1, a priority of each group is marked during a groping operation by means of the KNN algorithm, and the priority of a large group is set to 3, and the priority of a small group is set to 1.

In Example 2, the address of 10.25.1.1 is set to have the highest priority of 1, while an IP address of a thermostat system, an air conditioning system or a surveillance system is set to have the second highest priority of 2.

In Example 3, the historical data may be further classified into categories, such as security, life and recreation categories, and then the levels of the priority may be determined according to the categories.

In Example 4, the priority of an address of a sensing device (e.g., a temperature sensor or an infrared sensor) is set to 1, that of a general appliance is set to 2, and that of a mobile apparatus is set to 3.

For instance, if it is assumed that an alarm system is to send a warning that temperature of a gas stove is over-high through a smart television. Due to the priority of the temperature sensor of the gas stove being 1, and the priority of the alarm system also being 1, a packet sent by the temperature sensor of the gas stove is preferentially transmitted. In the occasion of the alarm system (having the priority of 1) transmitting the packet to the smart television (having the priority of 2), the packet transmitted by the alarm system still has the highest priority for transmission due to the source of the packet having the priority of 1.

Additionally, for instance, it is assumed that the user wants to turn on a home air conditioner through a cell phone. In this case, it is assumed that the priority of the cell phone is 3, and the priority of the air conditioner is 2, and thus, the packet transmitted by the cell phone has the second highest priority for transmission.

In Example 5, a group of "from source address to destination address" may also be defined by means of analysis. For example, in case the source address is the temperature sensor, and the destination address is the air conditioner (i.e., the packet is transmitted from the temperature sensor to the air conditioner), the group thereof has the priority of 2, while if case the source address is the temperature sensor, and the destination address is the television (i.e., the packet is transmitted from the temperature sensor to the television), the group thereof has the priority of 1.

However, the aforementioned is only an example for illustration, and the disclosure is not limited thereto.

Afterwards, in step S320, the controller 110 converts the format of the packet from the switching format to a target format by using a protocol converter 111 and temporarily stores the packet in a queue. For example, the target format may be a JavaScript Object Notation (JSON) format or an eXtensible Markup Language (XML) format. For example, an order of the packet in the queue is determined according to the priority, i.e., the packet is sorted according to the priority in the queue.

Then, in step S325, the controller 110 relays the packet to the destination address according to the priority and the destination address of the packet. Additionally, the controller 110 also transmits the packet to the gateway 20, such that the gateway 20 transmits the packet to the destination address.

Furthermore, after receiving the packet, the controller 110 may further determine whether the gateway 20 transmitting the packet is valid through the apparatus management server 112. For example, the apparatus management server 112 records gateway addresses accepted thereby. In case the apparatus management server 112 does not record an address of the gateway 20 and is incapable of recognizing the gateway 20 transmitting the packet, the controller 110 determines that the gateway 20 is invalid through the apparatus management server 112, so as to ignore or delete the packet, such that the packet is not relayed to the destination address. When determining that the gateway 20 is valid, the format of the packet is converted from the switching format to the target format through the protocol converter 111.

After receiving the packet and converting the format of the packet from the switching format to the target format, the controller 110 may further store the packet in the training database 120, so as to update the security policy.

To summarize, in the disclosure, the controller unravels each of the received data (or the packet) by means of collecting, classifying, summarizing, analyzing and evaluating and finally, outputs "post-analyzed data" to serve as "beforehand prediction information" (i.e., the security policy), which is provided to the gateway for perform immediate anomaly determination, instead of the post-processing in the conventional system. Thereby, the processing and the determination of the anomaly of the packet can be speeded up. Meanwhile, the normal packet is placed in the queue and transmitted to the destination address according to the priority thereof, so as to achieve immediate splitting and inbound/outbound load balance. Moreover, the misuse detection and the anomaly detection are utilized, such that the security policies for filtering the packets can be established based on the two detection modes. Due to the security policy being established by combining the two detection modes, the accuracy of filtering the packets can further be increased.

In case a plurality of packets intends to rush in the controller together, the packets may be processed in a first in first out (FIFO) manner in the related art; however, in an occasion of heavy traffic, the FIFO manner may result in serious bottleneck. Accordingly, the disclosure proposes a solution utilizing a smart splitting method for avoiding the aforementioned situation. For example, it is a commonly seen situation that many packets are transmitted on the network, and when an unknown packet enters, the controller first classify the packets by using the KNN algorithm to expect for an increased speed of recognizing and splitting the packets. When the features contained in the packet tend to a "know group", the anomaly detection is utilized to filter other features; and when the features contained in the packet feature tend to an "unknown group", the misuse detection is utilized to filter other features.

After the gateway receives the packet, the packet is compared according to the first security policy, determined as an abnormal packet and not processed, so as to achieve an effect of reducing the traffic. In addition, after the controller receives the packet, the packet is compared according to the priority information (e.g., whether the packet source=a designated address) of the second security policy, and if the packet source meets the designated address, the packet is preferentially placed in the queue, which changes the conventional FIFO manner, so as to improve the performance of traffic control.

Namely, the abnormal packets are modified or directly discarded without being processed, while the normal packets are placed in the queue and set with priority orders to be directly transmitted the destination addresses, such that the determination of the anomaly of packets can be speeded up for immediate splitting to achieve inbound/outbound load balance.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. An anomaly prediction method for heterogeneous network architecture, comprising:
   receiving a packet from an electronic apparatus and converting the packet to conform to a switching format through a gateway, wherein the gateway has at least one first security policy;
   comparing the packet conforming to the switching format and the at least one first security policy to determine whether the packet has anomaly through the gateway;
   after determining that the packet has no anomaly, transmitting the packet to a controller through the gateway, and setting a priority of the packet based on at least one second security policy through the controller;
   converting a format of the packet from the switching format to a target format and temporarily storing the packet conforming to the target format in a queue through the controller; and
   relaying the packet to a destination address according to the priority and the destination address of the packet by the controller.

2. The anomaly prediction method according to claim 1, wherein the at least one first security policy records a security rule and a corresponding processing operation, and the anomaly prediction method further comprises:

converting the at least one first security policy to conform to a format of a storage table of the gateway to write the at least one first security policy into the storage table through the gateway after receiving the at least one first security policy, wherein the step of writing the at least one first security policy into the storage table comprises:

writing the security rule into a rule column; and writing the processing operation into an operation column, wherein the storage table further comprises a status column recording a packet count of the gateway receiving the packet.

3. The anomaly prediction method according to claim 1, wherein the at least one first security policy records a security rule and a corresponding processing operation, and the step of determining whether the packet conforming to the switching format has anomaly based on the at least one first security policy through the gateway comprises:

comparing the received packet and the security rule; and when the packet is determined as matching the security rule, obtaining the processing operation corresponding to the matched security rule through the gateway.

4. The anomaly prediction method according to claim 3, wherein when the packet matches the security rule, the step of obtaining the processing operation corresponding to the matched security rule through the gateway further comprises:

when the processing operation is a activate operation, transmitting the packet to the controller through the gateway;

when the processing operation is a filter operation, modifying the packet to make the packet has no anomaly and then transmitting the modified packet to the controller through the gateway; and when the processing operation is a block operation, blocking the packet through the gateway to stop the gateway from transmitting the packet.

5. The anomaly prediction method according to claim 1, wherein the at least one second security policy records a security rule and priority information, and the anomaly prediction method further comprises:

converting the at least one second security policy to conform to a format of a storage table of the controller to write the at least one second security policy into the storage table through the controller, wherein the step of writing the at least one second security policy into the storage table comprises:

writing the security rule into a rule column; and writing the priority information into a priority column.

6. The anomaly prediction method according to claim 1, wherein the at least one second security policy records a security rule and priority information, and the after the step of transmitting the packet to the controller through the gateway, the method further comprises:

comparing the received packet and the security rule; and when the packet is determined as matching the security rule, setting the priority of the packet based on the priority information.

7. The anomaly prediction method according to claim 1, further comprising:

generating the at least one first security policy and the at least one second security policy through the controller; and transmitting the at least one first security policy to the gateway through the controller, wherein the step of generating the at least one first security policy and the at least one second security policy comprising:

analyzing a plurality of packet records to obtain an anomaly group and a misuse group;

obtaining a positive sample from the anomaly group, and obtaining a negative sample from the misuse group; and establishing the at least one first security policy and the at least one second security policy based on the positive sample and the negative sample, wherein the packet records are stored in a training database, and the positive sample and the negative sample are stored in a pattern database.

8. The anomaly prediction method according to claim 1, wherein after the step of transmitting the packet to the controller through the gateway, the method further comprises:

determining whether the gateway transmitting the packet is valid through the controller;

when the gateway is determined as valid, converting the format of the packet from the switching format to the target format through the controller; and when the gateway is determined as invalid, stopping relaying the packet to the destination address.

9. The anomaly prediction method according to claim 1, wherein the step of relaying the packet to the destination address by the controller comprises:

transmitting the packet to the gateway by the controller, and transmitting the packet to the destination address by the gateway.

10. The anomaly prediction method according to claim 1, wherein the step of temporarily storing the packet in the queue comprises:

determining an order of the packet in the queue according to the priority.

11. An anomaly prediction system for heterogeneous network architecture, comprising:

a gateway, having at least one first security policy, receiving a packet from an electronic apparatus, converting the packet to conform to a switching format, and comparing the packet conforming to the switching format and the at least one first security policy to determine whether the packet has anomaly, so as to transmit the packet after determining that the packet has no anomaly; and a controller, comprising a protocol converter, wherein after receiving the packet from the gateway, the controller sets a priority of the packet based on at least one second security policy, and the protocol converter converts the format of the packet from the switching format to a target format, and temporarily stores the packet conforming to the target format in a queue, and the controller relays the packet to a destination address according to the priority and the destination address of the packet.

12. The anomaly prediction system according to claim 11, wherein the at least one first security policy records a security rule and a corresponding processing operation, and the anomaly prediction system is further configured to:

after the gateway receives the at least one first security policy, the gateway converts the at least one first security policy to conform to a format of a storage table of the gateway to write the at least one first security policy into the storage table, wherein the storage table comprises:

a rule column, recording the security rule; and an operation column, recording the processing operation; and a status column, recording a packet count of the gateway receiving the packet.

13. The anomaly prediction system according to claim 11, wherein the at least one first security policy records a security rule and a corresponding processing operation, the gateway compares the received packet and the security rule and obtains the processing operation corresponding to the matched security rule when determining that the packet matches the security rule.

14. The anomaly prediction system according to claim 13, wherein when the processing operation is a activate operation, the gateway transmits the packet to the controller;

when the processing operation is a filter operation, the gateway modifies the packet to make the packet has no anomaly and then transmits the modified packet to the controller; and when the processing operation is a block operation, the gateway blocks the packet and stops from transmitting the packet.

15. The anomaly prediction system according to claim 11, wherein the at least one second security policy records a security rule and priority information, the controller converts the at least one second security policy to conform to a format of a storage table of the controller to write the at least one second security policy into the storage table, wherein the storage table comprises:

a rule column, recording the security rule; and a priority column, recording the priority information.

16. The anomaly prediction system according to claim 11, wherein the at least one second security policy records a security rule and priority information, after the gateway transmits the packet to the controller, the controller compares the received packet and the security rule and sets the priority of the packet based on the priority information when determining that the packet matches the security rule.

17. The anomaly prediction system according to claim 11, further comprising an anomaly prediction apparatus, wherein the anomaly prediction apparatus comprises:

a training database, storing a plurality of packet records;

a pattern database, storing an anomaly group and a misuse group; and a transmission module, transmitting the at least one first security policy to the gateway wherein the controller comprises:

a classifier, analyzing the packet records to obtain the anomaly group and the misuse group;

a recognizer, obtaining a positive sample from the anomaly group and obtaining a negative sample from the misuse group; and a generator, establishing the at least one first security policy and the at least one second security policy based on the positive sample and the negative sample.

18. The anomaly prediction system according to claim 11, wherein the controller further comprises:

an apparatus management server determining whether the gateway transmitting the packet is valid, wherein the protocol converter converts the format of the packet from the switching format to the target format when determining that the gateway is valid and the apparatus management server stops transmitting the packet to the destination address when determining that the gateway is invalid.

19. The anomaly prediction system according to claim 11, wherein the controller transmits the packet to the gateway, and then the gateway transmits the packet to the destination address.

20. The anomaly prediction system according to claim 11, wherein the controller determines an order of the packet in the queue according to the priority.

* * * * *